(No Model.)
J. B. GRISWOLD.
ROD PACKING.
No. 499,422.     Patented June 13, 1893.
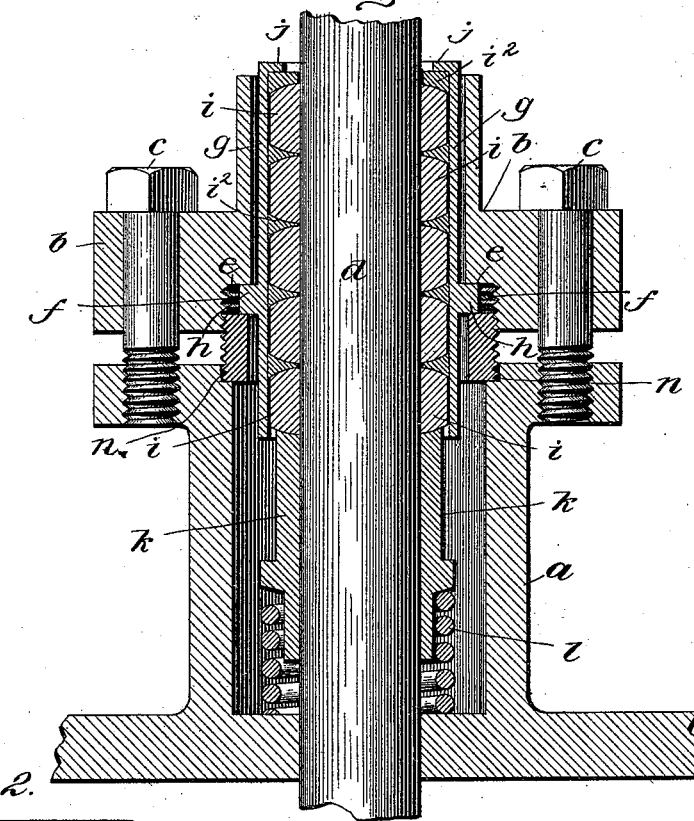
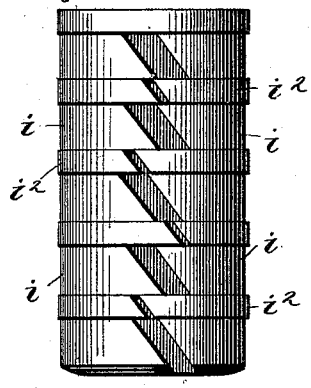
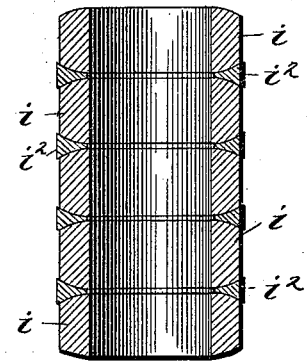
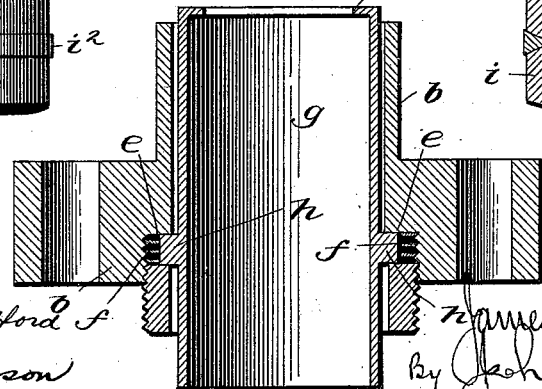
Witnesses
Edwin L. Bradford
Guy A. Johnson
Inventor
James B. Griswold
By Johnson & Johnson
his Attorneys.
THE NORRIS PETERS CO., PHOTO-LITHO., WASHINGTON, D. C.

UNITED STATES PATENT OFFICE.

JAMES BARNARD GRISWOLD, OF McCOOK, NEBRASKA.

ROD-PACKING.

SPECIFICATION forming part of Letters Patent No. 499,422, dated June 13, 1893.

Application filed October 4, 1892. Serial No. 447,831. (No model.)

*To all whom it may concern:*

Be it known that I, JAMES BARNARD GRISWOLD, a citizen of the United States, and a resident of McCook, in the county of Red Willow and State of Nebraska, have invented certain new and useful Improvements in Rod-Packing for Stuffing-Boxes, of which the following is a specification.

My invention relates to metallic packing for the stuffing boxes of piston and valve rods; and the object of my improvements is to provide a construction whereby the packing is rendered self adjusting to the rod, durable and effective; and my said improvements consist of certain novel parts and combinations of parts hereinafter specifically set forth in the claims concluding this specification.

The accompanying drawings illustrate my improved rod packing, wherein—

Figure 1 is a longitudinal section of a stuffing box and rod packing. Fig. 2 shows the series of packing rings in elevation. Fig. 3 is a vertical section of the same. Fig. 4 shows the follower and the sleeve which contains the packing rings secured within the follower by the screw ring.

$a$ is a stuffing which I have shown on the head of a steam cylinder, and $b$ is a follower which is secured to the stuffing box by screw bolts $c$, and $d$ is the piston or valve rod. The follower is formed with an interior annular shoulder $e$, which terminates in an enlarged screw threaded recess $f$ open at the inner face of the follower. A packing sleeve $g$ on the rod fits within the follower so as to have a slight lateral play therein; and this sleeve has an external annular collar $h$ which fits and forms a ground joint on the annular shoulder $e$ of the follower so that the end of the sleeve projects beyond the inner face of the follower. Within this sleeve are placed a series of packing rings $i$, which closely fit the rod and the inner wall of the sleeve and fill the sleeve from end to end. At its outer end the sleeve has an interior collar $j$ against which the rings abut, but which does not form a packing joint with the rod; while a gland $k$ on the rod enters the inner end of the sleeve and abuts against the rings. A spring $l$ within the stuffing box serves to force the gland against the packing rings, so that the latter are cushioned against the inward movement of the piston rod. The packing rings are split and form a steam tight joint upon the rod and within the sleeve. At their edges on both sides they are rounded and form joints with matching split rings $i^2$ of less width and form at their inner edges, a mere fin between the wider rings. These rings by their construction are made capable of movement upon each other with a wedge like action. This wedge like action tends to contract the wide rings and keep them in close contact with the rod and to expand the narrow rings and keep them in close contact with the inner wall of the sleeve to form a steam tight packing for the rod within the sleeve. The object of making the rings of unequal width is to obtain an expanding action of the narrow rings upon the sleeve with comparative little friction; while the wide rings are contracted upon the rod and have practically an unbroken bearing thereon.

It is important to hold the sleeve firmly upon its ground joint $e$ and at the same time to permit it to have a lateral play thereon to conform to and to be free to adjust itself to any inequality of the rod caused by wear thereof, and for this purpose I provide a screw ring $m$ screwed into the recess $f$ in the follower against the annular shoulder $h$ of the sleeve, which is thereby pressed against the interior annular shoulder $e$ of the follower. This gives a steam tight joint and allows me to use a follower which has no joining connection with the stuffing box. I use this screw ring to make a ground joint upon the flange of the stuffing box, and thereby form a steam tight joint in the open space between the follower and the box. This screw ring renders it unnecessary to form the follower with a covering gland; or to join the bolted parts with a packed joint; or to pack the cylinder head opening through which the rod moves. The double function of the screw ring is therefore important as a separate device for holding the sleeve within the follower at the joining of the sleeve therewith, and as a means of closing it with the outer end of the cylinder head box so as to make a steam tight joint outside of the sleeve between the cylinder and the follower which contains the sleeve, and to exclude rain, dirt and dust from the sleeve. The screw ring also forms a ground joint with the shoulder of the sleeve so that both ends of the screw ring form steam tight joints. As the sleeve forms no wear joint on the rod, it will last a long time. The action of the packing rings upon each other is like a ball and socket joint at both sides, so that there will be no cramping or opening of their sides in conforming to the wear of the rod. The ring wear surfaces on the inner wall of the sleeve being less than their wear surfaces on the rod; and the sleeve having no wear joint on the rod, and the rings occupying the full length of the sleeve, very greatly reduce the wear friction on the rod, and allow freedom for the self adjusting action of the rings upon the rod and upon the sleeve. The outer end of the stuffing box may have an annular recess $n$ to receive the screw ring and the joint formed thereby is made steam tight and protects the sleeve and packing from the weather.

I make the rings of least width concave on their opposite sides so as to act upon the convex sides of the wide rings to press them inward upon the rod and in this action the narrow rings are pressed outward upon the sleeve, so that while forming a steam tight joint with it they have a comparatively small surface bearing on the sleeve. This in connection with the sleeve having no wearing joint on the rod, lessens the wear on the rod and saves power.

The Babbitt metal rings which form the wear joints upon the rod can be replaced when worn out, and the sleeve and the outer rings will last a long time.

I claim as my improvement in steam-packing for piston and valve rods—

1. In a rod packing, in combination, a ring open alike at both ends and having a circumferential screw thread which engages the follower and makes a tight joint with the flanged end of the stuffing box, the follower $b$ having an interior screw threaded recess $f$, the packing sleeve having an external annular collar, the stuffing box and the bolts engaging the latter, substantially as described.

2. The combination, with a packing-containing-sleeve having an annular collar, a follower having an annular screw-threaded recess $f$, a box having a non-threaded recess $n$, a screw-ring open alike at both ends, and engaging said screw-threaded recess, and the bolts, whereby the sleeve-collar is clamped upon the shoulder of said recess, and the screw-ring is clamped within the non-threaded box recess, for the purpose stated.

In testimony whereof I have hereunto signed this specification in the presence of witnesses.

JAMES BARNARD GRISWOLD.

Witnesses:
T. J. PATE,
T. J. BRYAN,
LOUIS LOVEJOY,
L. R. MUCKEY.